United States Patent
Delmoro et al.

(10) Patent No.: US 6,520,294 B2
(45) Date of Patent: Feb. 18, 2003

(54) TIRE BEAD LUBRICATING ASSEMBLY AND METHOD OF LUBRICATING A TIRE BEAD

(75) Inventors: Richard L. Delmoro, Tallmadge, OH (US); John Joseph Spence, Akron, OH (US)

(73) Assignee: Akron Special Machinery, Inc., Akron, OH (US)

( * ) Notice: Subject to any disclaimer, the term of this patent is extended or adjusted under 35 U.S.C. 154(b) by 0 days.

(21) Appl. No.: 09/725,776

(22) Filed: Nov. 29, 2000

(65) Prior Publication Data

US 2002/0063019 A1 May 30, 2002

(51) Int. Cl.$^7$ .............................................. F16N 25/04
(52) U.S. Cl. ........................................................ 184/20
(58) Field of Search ............................. 184/18, 19, 20, 184/17, 101, 102

(56) References Cited

U.S. PATENT DOCUMENTS

| | | | | |
|---|---|---|---|---|
| 324,864 A | * | 8/1885 | McCorkindale | 101/213 |
| 2,537,851 A | * | 1/1951 | Pannier | 101/367 |
| 2,881,461 A | * | 4/1959 | Parker | 15/230.11 |
| 3,001,609 A | * | 9/1961 | Macks | 184/18 |
| 3,658,152 A | * | 4/1972 | Mueller | 118/233 |
| 4,638,756 A | * | 1/1987 | Collmann | 118/215 |
| 5,992,568 A | * | 11/1999 | Craig et al. | 105/72.2 |
| 6,070,697 A | * | 6/2000 | Millard | 184/15.1 |
| 6,082,191 A | * | 7/2000 | Neiferd et al. | 73/146 |

OTHER PUBLICATIONS

Hasbach Maschinenund Anlagenbau GmbH "Perfection in Testing".

* cited by examiner

*Primary Examiner*—Christopher P. Schwartz
*Assistant Examiner*—Xuan Lan Nguyen
(74) *Attorney, Agent, or Firm*—Reese Taylor

(57) ABSTRACT

A tire bead lubricating assembly for lubricating the bead area of a tire includes a lubricator sleeve mounted for reciprocal movement into and out of the center of the tire. The sleeve has an hourglass shape for engagement with the opposed bead of the tire when inserted into the center of the tire.

7 Claims, 6 Drawing Sheets

TIRE BEAD LUBRICATING ASSEMBLY AND METHOD OF LUBRICATING A TIRE BEAD

FIELD OF THE INVENTION

This invention relates in general to a tire lubricating assembly and relates in particular to a tire lubricating assembly designed for the lubrication of the bead area of a pneumatic tire.

BACKGROUND OF THE INVENTION

In many operations involving the manufacture of pneumatic tires, following fabrication and vulcanization, the tire is placed on a chuck assembly so that various inspection and grinding operations can be performed. Generally, for example, in a tire uniformity machine, tires are advanced along a driven conveyor, generally of the roller type, into the uniformity inspection machine whereupon a first chuck is raised to engage the bead area of the tire following which the tire is elevated so that the opposed bead is engaged by an opposed chuck member. The tire is then inflated and various inspections are conducted. The tire is then deflated, the lower chuck is retracted and the tire is removed from the chuck and moved on out of the machine so that another tire can be moved in.

In such a system and in other areas wherein tires are intended to be mounted on chucks for further manufacturing or inspection operations, it is desirable to lubricate the bead area along its seating surface so as to accomplish a complete air tight seal with the mating surfaces of the chuck or for that matter the wheel of an automobile.

BRIEF DESCRIPTION OF THE PRIOR ART

In the prior art, as can be seen in a catalog distributed by Hasbach Maschinen-und Anlagenbau GmbH, such a general arrangement is illustrated. That includes the driven, roller type conveyor which is disposed adjacent the machine which will perform an inspection and/or grinding operation on the tire and along which the tires advance. It will be seen in the prior art that generally a reciprocating, cylindrical lubricating sleeve in employed and is advanced upwardly from a lubrication chamber beneath the conveyor, through an opening in the conveyor, so as to be disposed inside the tire bead following which the tire is rotated about the sleeve by activation of the conveyor to receive the lubrication from the lubricating sleeve.

In the prior art, the lubricating sleeve is generally simply of cylindrical configuration. The difficulty encountered in the prior art is that the bead of the tire is not flat or straight. Tire beads taper from the inside to the outside of the tire at an angle to facilitate eventual air tight seating against the rim of a vehicle wheel. Therefore, use of a straight walled applicator sleeve results in contact of the tip of the tire bead only and does not fully lubricate the bead surface. This leads to difficulties in achieving a complete bead coating and, thus, a complete seal between the tire bead and the seating surface of the chuck referred to above. This is believed to be undesirable because the tire is inflated during the inspection and/or grinding operation and the desired degree of inflation may be difficult to maintain.

It is therefore believed desirable to produce a tire lubricating assembly which will in fact fully lubricate all appropriate surface areas of the bead of the tire.

SUMMARY OF THE INVENTION

It had been found that the object aforementioned can be achieved by providing an hourglass shaped applicator having a dual taper such that it tapers from its widest diameter at its opposed ends toward a narrower diameter in the center. It has been found that the utilization of such an applicator in a tire bead applicator assembly will enable the sleeve to fully contact all the appropriate tapered surface areas of the bead thus ensuring that the lubrication medium is fully applied thereto.

It has also been found that the lubrication chamber into which the sleeve is inserted and retracted for engagement with the tire can be provided with a unique lubrication chamber cap which has a central aperture so that the sleeve may reciprocate through it and which has a top surface which tapers from the periphery toward the central aperture to serve as a funnel to return excess lubrication medium back into the lubrication chamber thus avoiding waste and possible unsafe conditions below and adjacent to the conveyor.

Accordingly, production of an improved tire bead lubricating assembly of the character above-described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
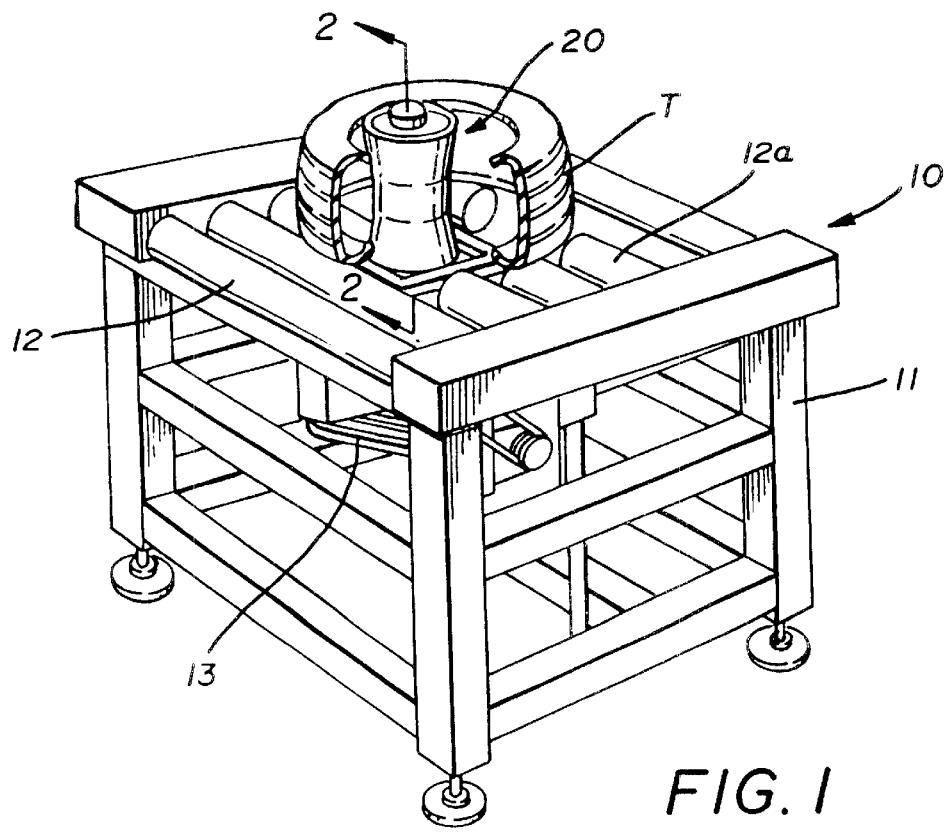
FIG. 1 is a perspective view showing the improved tire bead lubricating assembly in place on a conventional conveyor.

Referring first to FIG. 1 of the drawings, it will be seen that the conveyor assembly 10 is essentially conventional in nature and includes a frame 11 and a series of rollers 12 disposed on the top of the frame. Some of these rollers extend the full distance between the side members of the frame 11 while others extend only partially therebetween so as to form an opening in the top surface of the conveyor 10 of sufficient size to permit the placement of the top cap of the lubricating chamber 21 through which the lubricating sleeve assembly 20 reciprocates to engage the tire bead B. FIG. 1 illustrates the tire T disposed on top of such a conveyor assembly 10 with the lubricating assembly 20 inserted into the interior of the tire in the bead area B.

It will be apparent from FIG. 1 that actuation of the conveyor drive means 13, which comprise a conventional belt and motor arrangement as illustrated and are not illustrated in great detail herein, will tend to drive the tire forward and cause the tire to rotate with its bead B contacting the outer surface or sleeve of the tire lubricating assembly 20.

Figure 2:
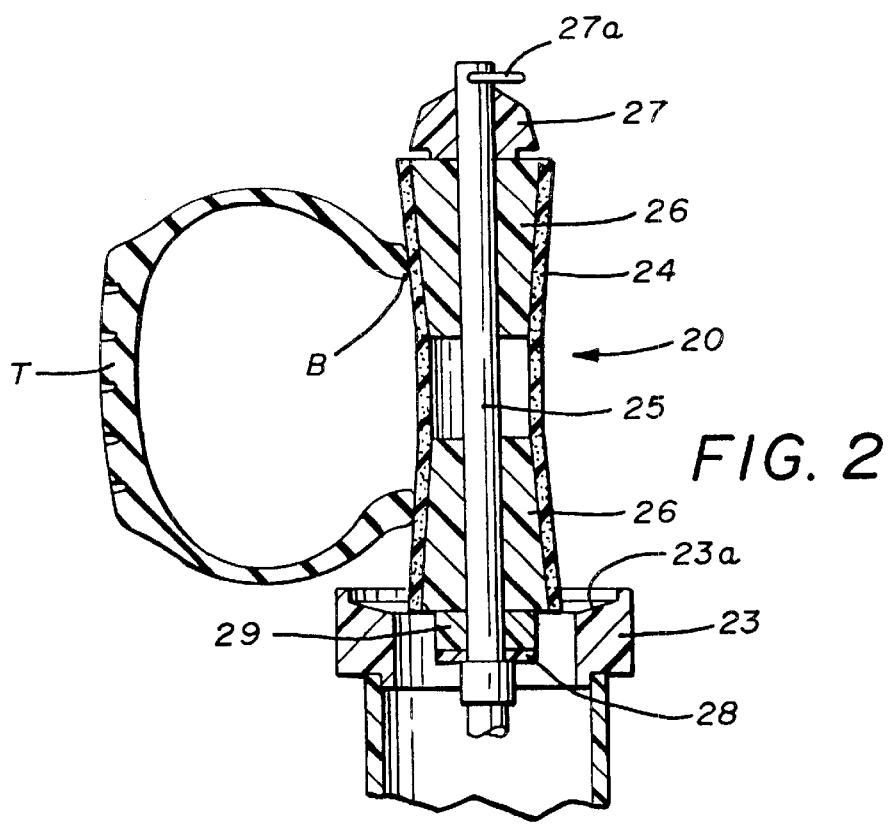
FIG. 2 is a sectional view taking along the line 2—2 of FIG. 1 showing the lubricating assembly in its extended position.
Figure 3:
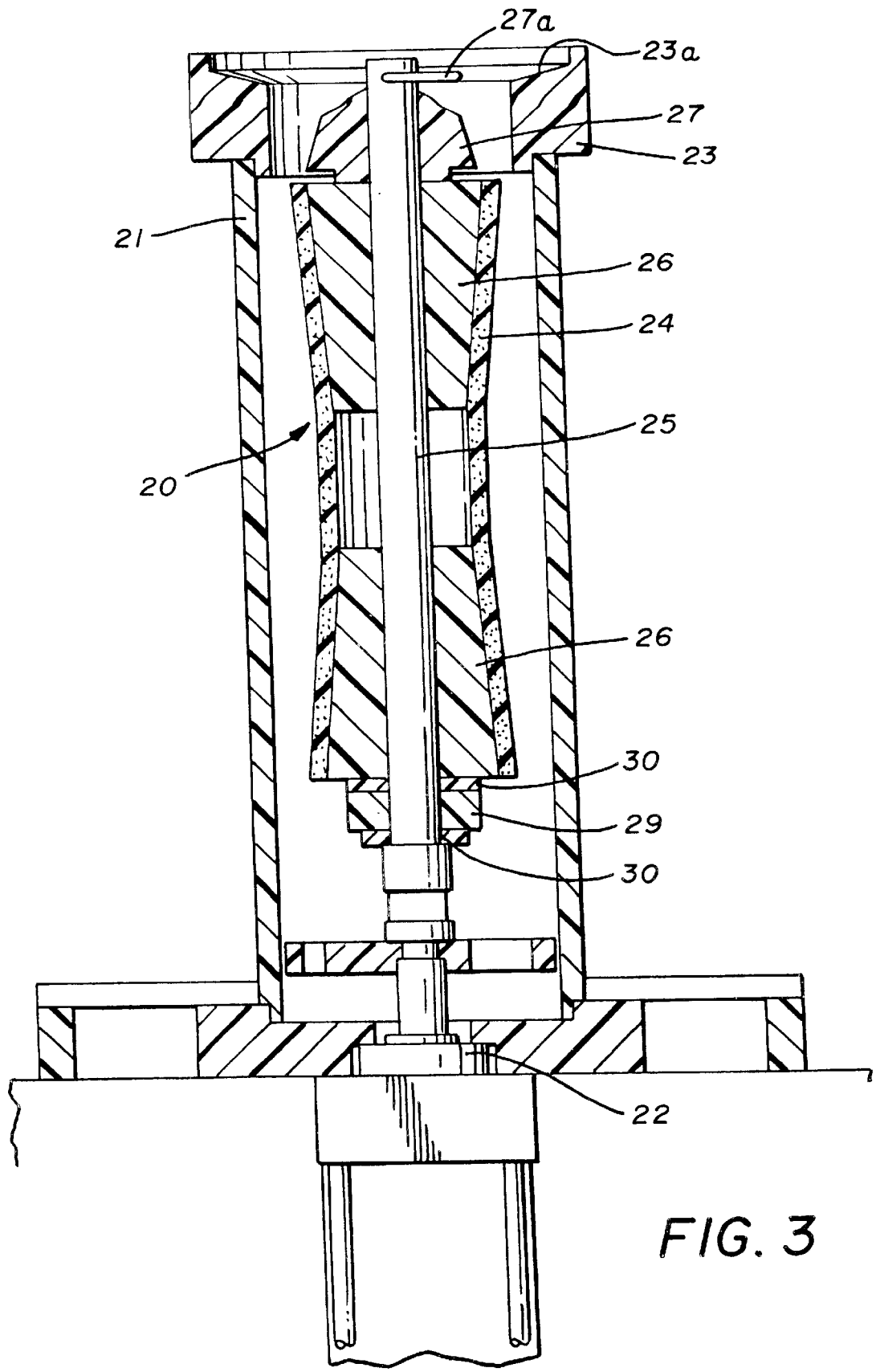
FIG. 3 is a sectional view similar to FIG. 2 showing the lubricating assembly in its retracted position inside the lubrication chamber.
Figure 7:
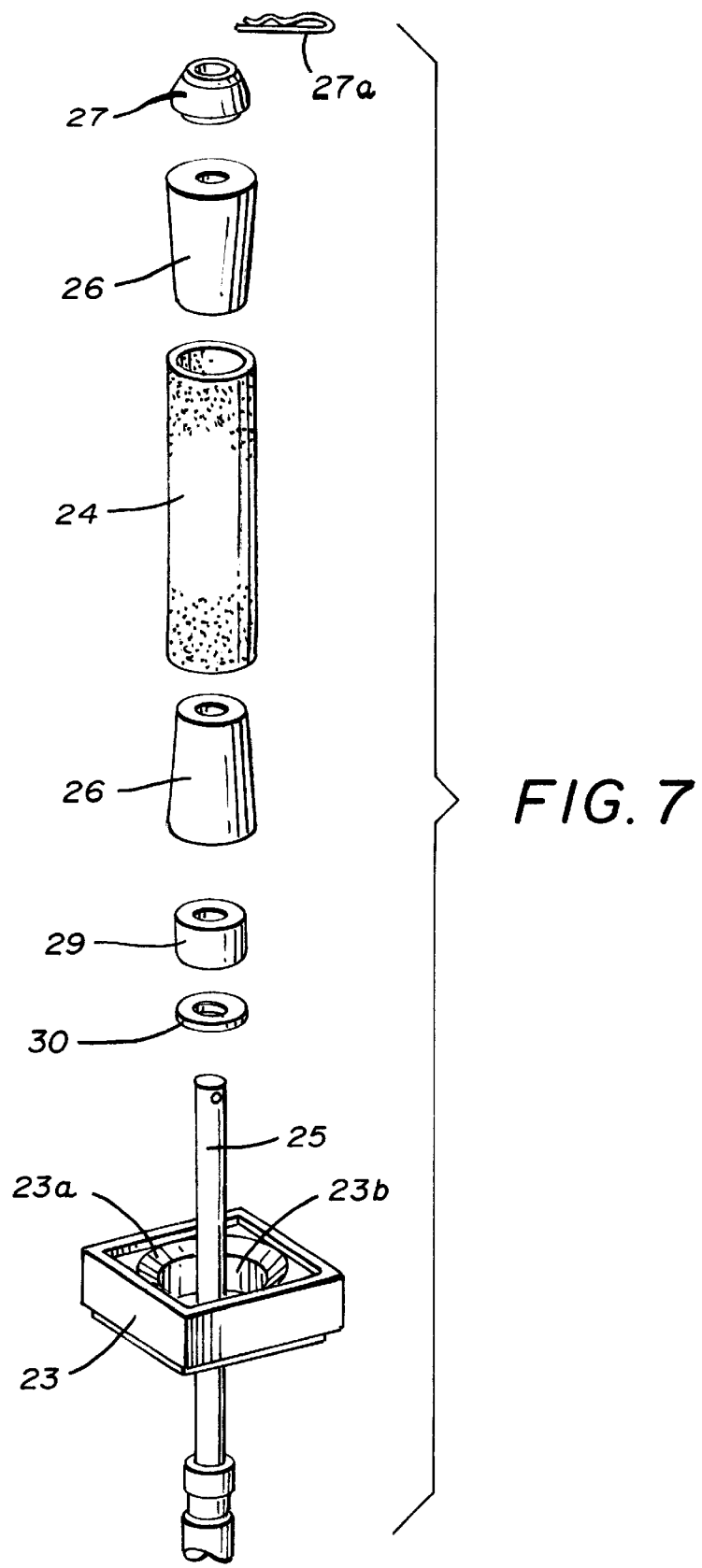
FIG. 7 is an exploded view showing the components of the improved tire bead lubricating sleeve assembly of FIG. 1.

Turning then to FIGS. 1, 2 and 7 of the drawings for a detailed description of the tire bead lubricating assembly 20 per se, it will be seen that the lubricating assembly 20 includes an applicator mandrel 25 in the form of an elongate rod which receives a lubricating sleeve 24 which, in turn receives a pair of conical inserts 26, 26 which are inserted into opposed ends of the sleeve 24. The lower conical insert is supported by spacer 29 and thrust bearing 30 while the top conical insert 26 is held in place by the mandrel cap 27 and pin 27a. The result, owing to the taper on conical inserts 26, 26, is that the sleeve 24 assumes an hourglass configuration tapering from its greatest diameter adjacent is ends to its least diameter adjacent its center. Alternatively, sleeve 24 could be molded directly onto a mandrel such as mandrel 25 with an hourglass configuration.

The mandrel 25 and sleeve 24 are mounted on a piston 22 below the conveyor by means of a thrust washer 28 so that upon actuation of the piston the lubricating assembly 20 may be reciprocated as desired.

Lubrication chamber 21 is disposed beneath the rollers 12 of conveyor assembly 10 and, in operation, the lubricating assembly 20 including the sleeve 24 is retracted down into the chamber 21 to receive lubrication fluid contained therein then raised up above the rollers to engage the previously positioned tire bead B as shown in FIG. 1. This is followed by actuation of the conveyor drive means 13 to cause the tire to rotate about sleeve 24.

It will be noted that the use of the opposed conical inserts 26, 26 renders what is normally a cylindrical sleeve into one having a generally hourglass shaped configuration which mates with the tapered configuration of the tire beads B as show in FIG. 2 of the drawings so as to ensure complete lubrication of the relevant tire bead surface.

Following a suitable period the conveyor drive 13 stops, the lubricating assembly 20 is retracted into lubricating chamber 21, the conveyor is restarted to move the lubricated tire on into the tire uniformity machine or other inspection apparatus. Simultaneously another tire moves into position and the cycle is repeated.

It will be noted that a unique lubrication chamber cap 23 is received on the top of the lubrication chamber 21. This cap has a top surface 23a and a central aperture 23b which is sized so as to permit the lubricating assembly to pass through it. The top surface 23a of cap 23 is tapered toward the central aperture 23b so that excess lubrication medium will drain back into the chamber 21 as the tire bead B is lubricated and as the tire lubricating assembly 20 is advanced and retracted into and out of the chamber 21.

Figure 4:
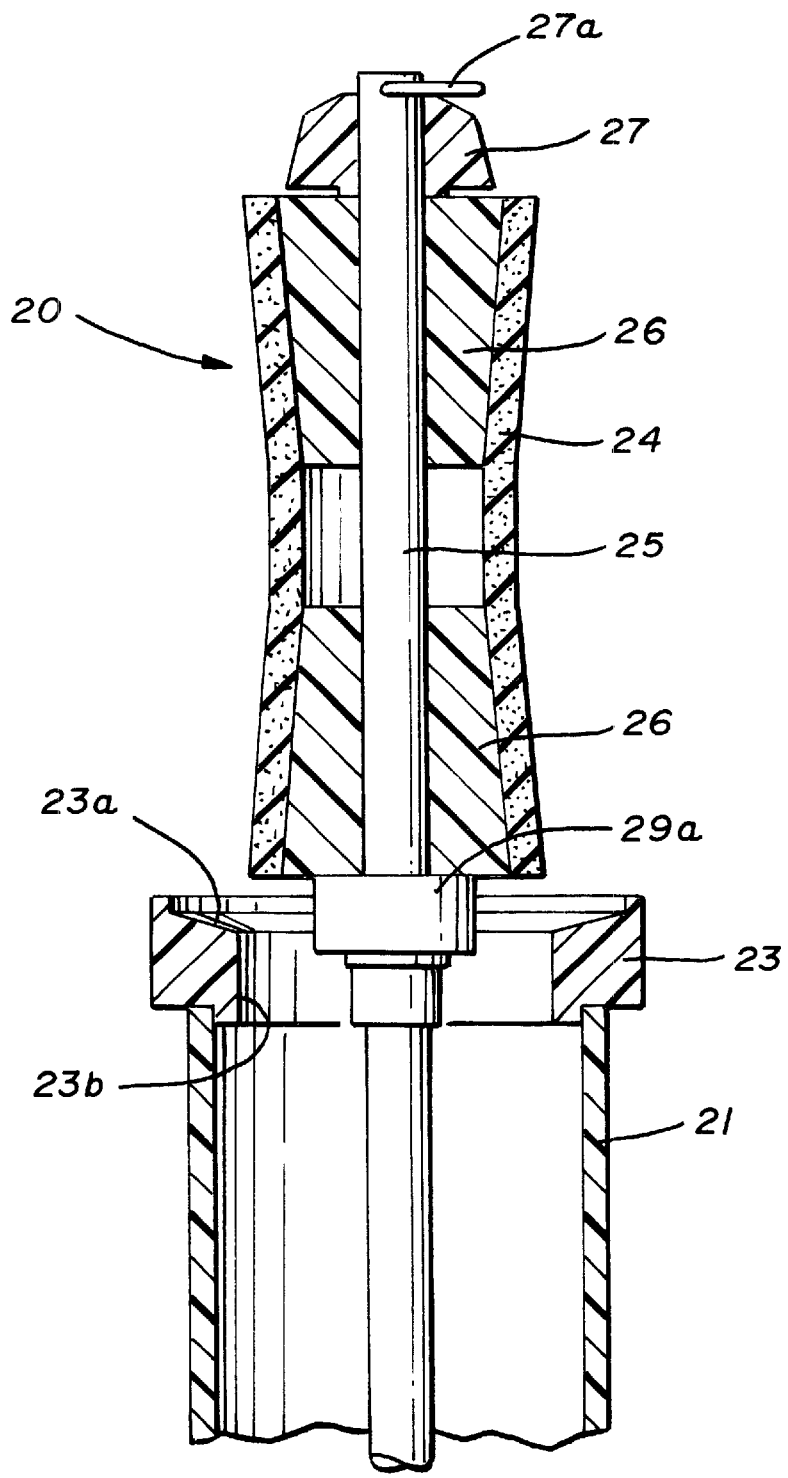
FIGS. 4, 5 and 6 are elevational views of modified forms of the invention showing adaptation of the invention to accommodate tires with varying bead wide.
Figure 5:
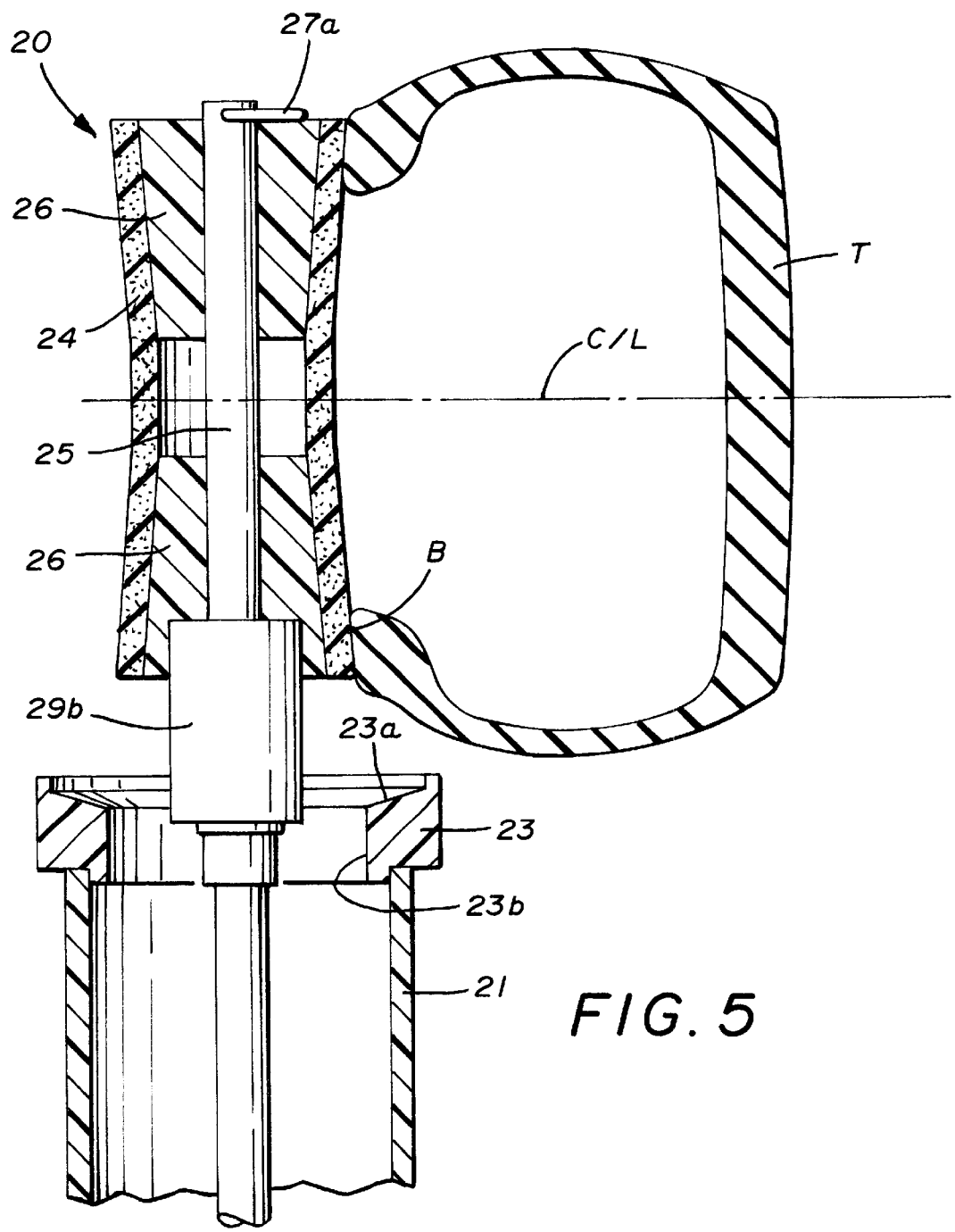
Figure 6:
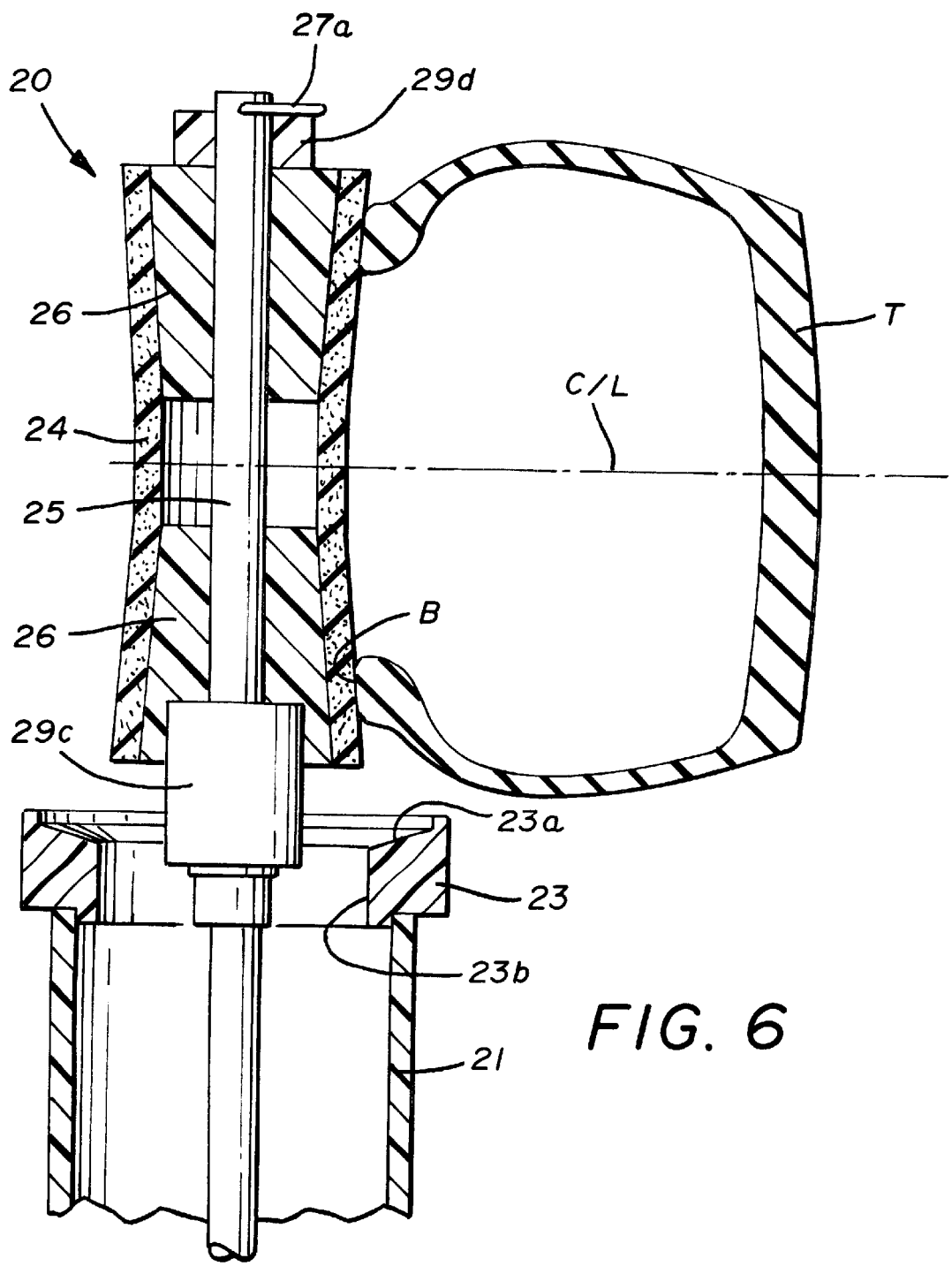

FIGS. 4, 5 and 6 illustrate modifications of the assembly of the basic invented concept.

It is desirable to position to the lubricating assembly 20 in its extended position so that contact with the bead area B of the tire T is full and complete. Inasmuch as the bead width of the tires will vary depending on the tire size, etc., it is believed desirable that the center line C/L of the tire coincide with the axial midpoint of the mandrel 25. This ensures that the tapered surfaces of the sleeve 24 will fully accommodate and mate with the bead areas. While it would be possible perhaps to alter the stroke of the piston 22 to achieve this, in most instances it is believed more desirable to the lubricating assembly 20 as shown in FIGS. 4, 5 and 6. For example, in FIG. 4 spacer 29a has been added beneath the lower insert 26. In FIG. 5 a spacer of a different length 29b has been added at the bottom and the mandrel cap 27 has been eliminated with the upper insert 26 being held in place by the pin 27a. FIG. 6 shows the addition of spacers 29c and 29d at the top and bottom of the mandrel to achieve yet another extended position for accommodating a different bead width. In all cases, the object is, as noted above, to register the axial midpoint of the mandrel 25 with the center line C/L of the tire T. Other combinations are believed possible.

It will be noted that no specific materials have been identified herein, but the sleeve 24 would normally be fabricated from a flexible and absorbent material such as sponge rubber so as to be able to carry a charge of lubricating medium from the chamber 21 and deposit it on the tire bead B.

While a full and complete description of the invention has been set forth in accordance with the dictates of the patent statutes, it should be noted that modifications can be resorted to without departing from the spirit hereof or the scope of the appended claims.

What is claimed is:

1. A tire bead lubricating assembly for use with a roller conveyor, comprising:
    a) a cylinder, disposed beneath the conveyor;
    b) a lubricator assembly attached to said cylinder whereby said lubricator may be raised and lowered relative to said conveyor;
    c) said lubricator assembly including a lubricator mandrel projecting from said cylinder and a lubricating sleeve assembly carried on said mandrel;
    d) said lubricator sleeve is elongate and has a generally hourglass configuration; and
    e) wherein said lubricating sleeve assembly comprises an elongate cylindrical hollow sleeve and a pair of conical inserts insertable in the opposed ends of said sleeve.

2. The tire bead lubricating assembly of claim 1 wherein said sleeve is fabricated from a flexible, absorbent material.

3. The tire bead lubricating assembly of claim 2 wherein said sleeve is fabricated from sponge rubber.

4. The tire bead lubricating assembly of claim 1 further characterized by the presence of a lubrication chamber for receipt of a lubrication medium; and said lubricator assembly is movable into and out of said lubrication chamber.

5. The tire lubricating assembly of claim 4 further characterized by the presence of a lubricating chamber cap received on one end of said chamber; and said lubricating chamber cap having a through, centrally disposed aperture therein and a top surface tapering downwardly toward said through aperture.

6. The tire bead lubricating assembly of claim 1 further characterized by the presence of at least one spacer received on said mandrel.

7. A tire bead lubricating assembly for use with a tire having a bead, comprising:
    a) a lubricator assembly adapted to be selectively contacted with the bead to apply a lubricant thereto;
    b) said lubricator assembly including a lubricator mandrel and a pair of inserts having a shape; and
    c) a hollow, flexible sleeve supported by said mandrel and adapted to fit over said inserts and assume said shape.

* * * * *